Patented Aug. 10, 1937

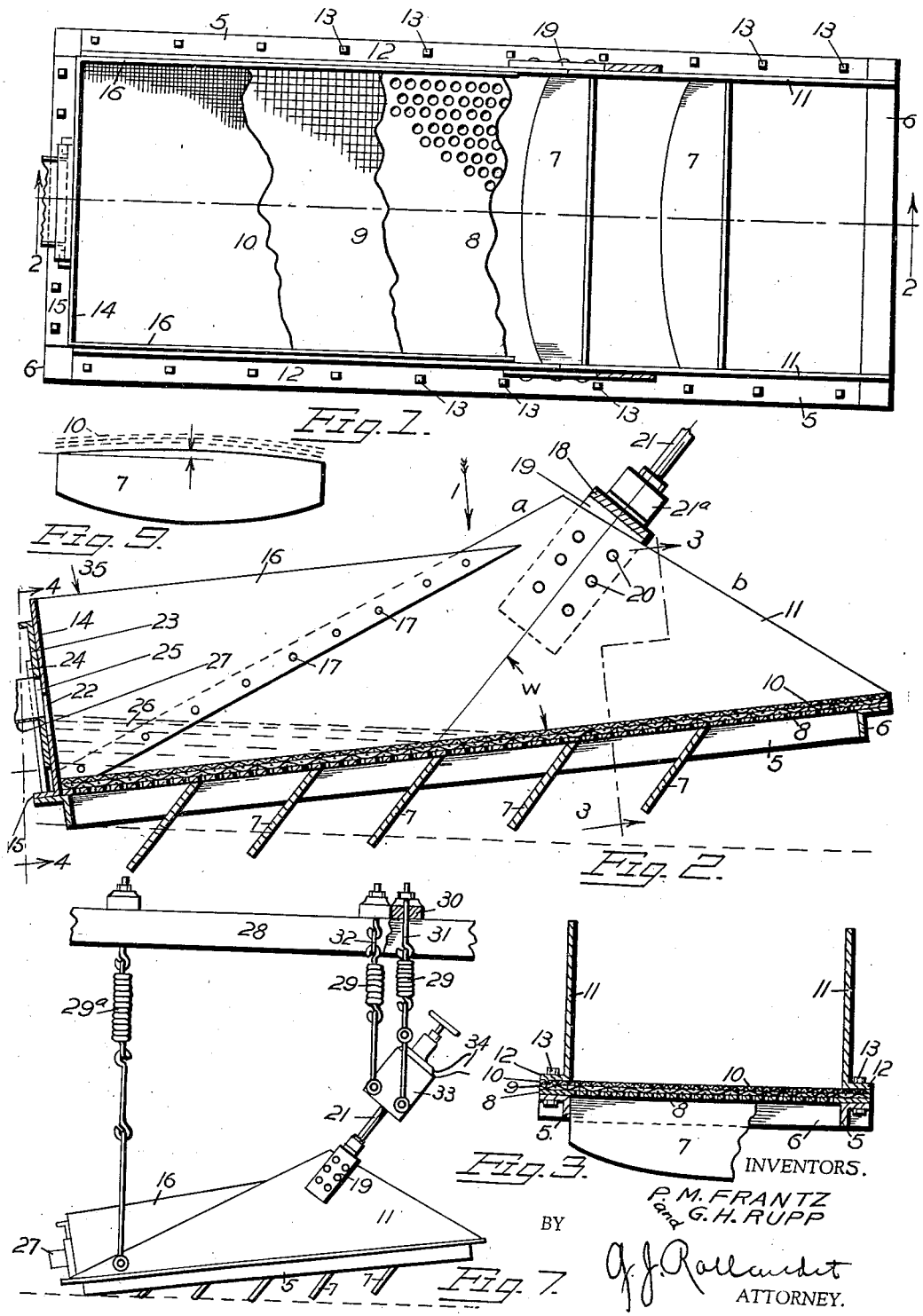

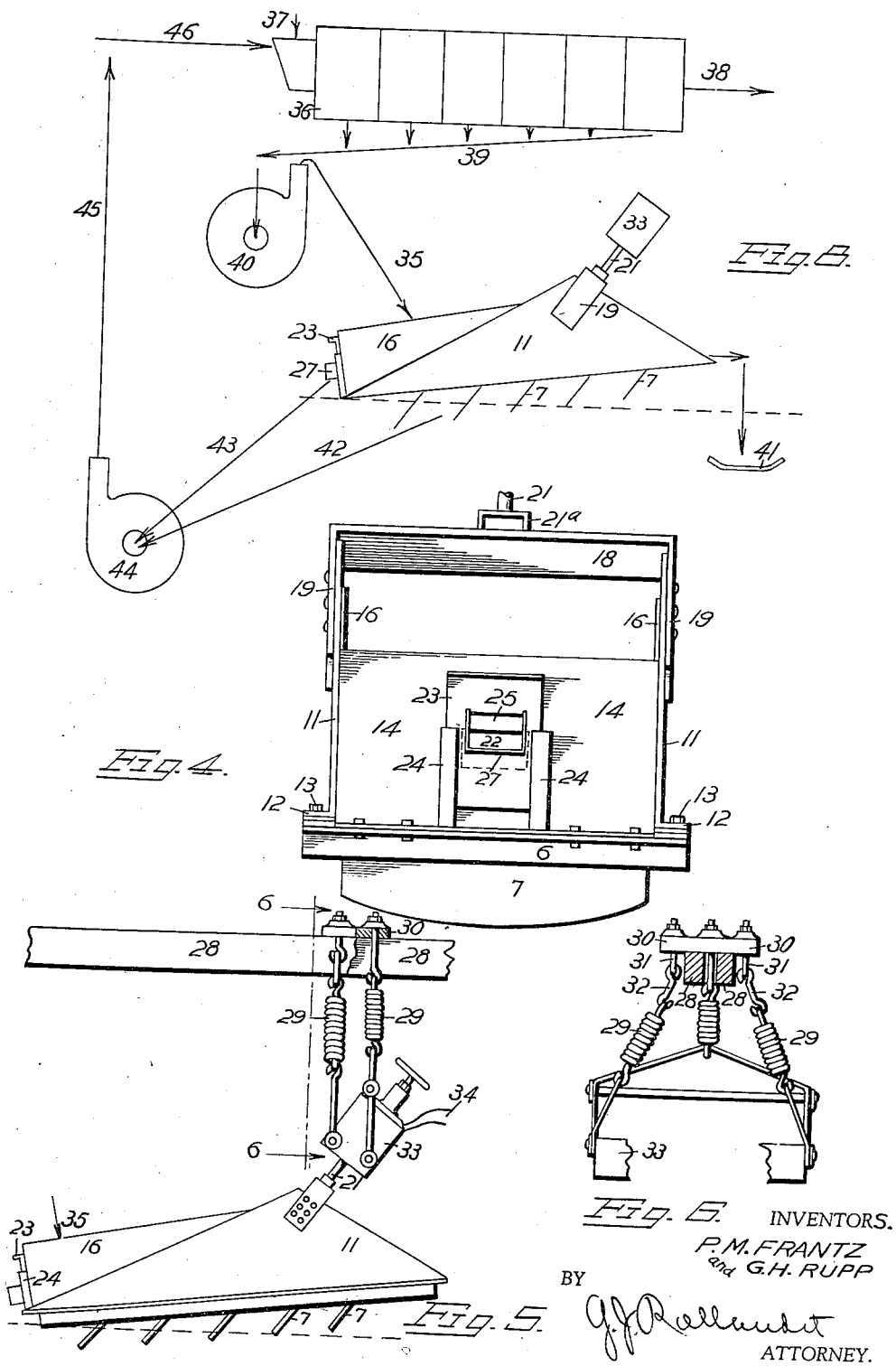

2,089,548

UNITED STATES PATENT OFFICE 2,089,548

MEANS OF FILTRATION

Philip M. Frantz and George H. Rupp, Pueblo, Colo., assignors, by mesne assignments, to The Colorado Fuel and Iron Corporation, a corporation of Colorado Application March 12, 1935, Serial No. 10,670

11 Claims. (Cl. 210—149)

This invention relates to improvements in mechanical filters and has reference more particularly to a filter that is especially well adapted for filtering coal and other materials having low specific gravity and cohesion.

It is an object of this invention to produce an apparatus by means of which the principle of the vibrating filter can be applied to the filtering of coal.

Another object is to produce a filter frame of substantially integral construction and great rigidity per unit weight and which will therefore vibrate as a whole during operation.

A further object is to produce a longitudinally inclined filter in which a pool of pulp is maintained at all times at its lower end and in which the filter cake is continually formed and from which it is continually removed.

A still further object of this invention is to produce a vibrating filter having a flat filter cloth bottom supported by transverse stiffening members only, as distinguished from members extending in the direction of vibration.

Another object is to produce a vibrating filter in which the filter cake also serves as a filter medium and at the same time continually travels upwardly along the inclined filter cloth.

The above and other objects that may become apparent as the description proceeds are attained by means of a construction and arrangement of parts that will now be described in detail, and for this purpose, reference will be had to the accompanying drawings in which the invention has been shown in its preferred form and in which Fig. 1 is a top plan view looking in the direction of arrow 1 in Fig. 2, portions of the bottom being broken away and the supporting yoke bar shown in section;

Fig. 2 is a longitudinal vertical section, taken on line 2—2, Fig. 1;

Fig. 3 is a transverse section taken on line 3—3, Fig. 2;

Fig. 4 is an end view looking in the direction of arrows 4—4 in Fig. 2;

Fig. 5 is a side elevation showing one method of suspending the filter;

Fig. 6 is an elevation looking in the direction of arrow 6 in Fig. 5, parts being shown in section and other parts broken away;

Fig. 7 is a side elevation, similar to that shown in Fig. 5, but showing a slightly different method of suspension;

Fig. 8 is a flow sheet showing the relationship of the filter to other elements in the system; and Fig. 9 is a plan view of a transverse stiffening member or beam, and shows the cambered upper edge greatly exaggerated.

In the drawings reference numerals 5 and 6 indicate respectively the side and end members of a frame; these members are light weight angle irons welded at the corners with the top faces of the outwardly extending flanges flush. The sides 5 are connected by a plurality of transversely extending stiffening members 7 whose ends are welded to the inside of the side angle irons 5 and 6 inclined with respect to the plane of the frame at an angle of approximately 45 degrees.

The stiffening members are so shaped that they approximate beams of constant stiffness, as shown in Figs. 3 and 9, and have their upper edges slightly curved or cambered as shown in Fig. 9 to prevent sagging of the filter medium supported thereby. Since the camber is only one quarter of an inch on each side of the middle it has not been shown in Fig. 3 and reference for this must therefore be had to Fig. 9.

Supported on the frame and the stiffening beams or members is a steel plate 8, which is approximately one eighth of an inch thick and provided with $\frac{1}{8}$ inch perforations on $\frac{3}{16}$ inch centers. Plate 8 has its under surface welded to the frame members 5 and 6 and to the cambered edges of members 7 and the assembly thus formed is light and very rigid. Supported on plate 8 is a 14 mesh brass wire cloth 9 and this in turn supports a brass wire filtering cloth 10 of 80 to 100 mesh. The wire screens 9 and 10 are stretched tight and smooth in the finished assembly.

Secured to the frame are sides 11 that have their lower edges provided with flanges 12 which are perforated for the reception of the clamping bolts or rivets 13 that extend through openings in the horizontal flanges of the frame members 5 and 6 and through the edges of the plate 8 and screens 9 and 10. The bolts or rivets 13 serve to clamp the parts and to maintain the filter cloth stretched tight and smooth.

Attached to the lower end of the frame is an end wall 14 which is provided with a flange 15 through which securing bolts or rivets 13 extend as shown in Fig. 1. End 14 is provided with integral triangular sides 16 that are attached to the inside of sides 11 by means of rivets 17 as shown in Fig. 2.

Sides 11 are in the form of scalene triangles whose bases are provided with flanges 12 and whose other two sides have been designated by letters a and b and in the form illustrated sides b are shorter than sides a.

Sides 11 are joined by a transverse yoke bar 18 whose ends 19 extend downwardly over the outside of sides 11 and are secured to them by rivets 20. A rod 21 is rigidly attached to the bar 18 by means of a bracket 21a.

The axes of the rod 21 and the sides 19 have been shown as forming an angle W of approximately 45 degrees with the plane of the frame which angle will be referred to hereinafter as the "angle of impact". The stiffening members 7 are positioned with their planes parallel with the axis of rod 21 so as to prevent the production of any forces that have a tendency to bend the stiffening members sidewise.

The sides 11 are so shaped that they form beams of constant stiffness having great strength per unit of weight and can therefore be made of comparatively thin material.

The end 14 is provided with a discharge opening 22 and is provided with a slidably mounted gate 23 that runs in guides 24. The gate has an opening 25 which is preferably of the same size as opening 22 and by raising and lowering the gate the level of the pool 26 can be controlled, since the lower side of the opening 25 forms a weir overflow.

A launder 27 can be attached to the gate if desired. Instead of having the gate on the outside as shown in the drawings it is evident that it may be on the inside. Some means is provided to clamp the gate in adjusted position to prevent it from moving during the vibration of the filter but this has not been shown.

Referring now to Figure 5, it will be seen that the filter is supported from the beams 28 by means of three springs 29 whose upper ends are attached to the plate 30 by means of eye bolts 31 and links 32. A housing 33 is supported from the lower ends of the springs and this carries an electric vibrator of some known and approved type, and which is provided with a vibrating armature (not shown) to which the rod 21 is attached. An interrupted or an alternating current is transmitted to the vibrator through the wires 34. The vibrator must be so constructed that it will produce an unsymmetrical or differential vibration of the filter in the direction of the axis of rod 21 for the purpose of producing a travel of material from the lower to the higher end of the filter. This can be effected by having the upward movement of the filter stop abruptly at its upper limit which jars the material and throws it upwardly, or the movement can be such that the downward movement is faster than the upward, or has an acceleration greater than gravity which also produces an upward travel on the inclined filter medium when the vibrations are imparted thereto at an angle of impact substantially as shown. Since vibrators having the necessary properties are well known further description thereof will not be made.

The material, such as coal pulp is introduced to the filter at its lower end, at the point indicated by arrow 35, at such a rate that a pool of pulp is maintained at the level 26, and this pool may vary in depth from 3 to 7 inches. The pulp for the treatment of which this filter is primarily intended, consists of fine coal from say 1/8 inch to fine dust of zero size mixed with water in proportions varying from as low as 20% solids to as high as 50% solids by weight. The vibrations cause the coal to form a sheet or cake on the surface of the filter medium and the water to pass through the cloth. The cake appears to come from the pool of pulp ready formed and only requires a short additional time on the filter cloth to remove the greater part of the water.

The differential vibrations cause the coal cake to travel upwardly along the filter cloth in a sheet varying from 1/2 inch to 4 inches thick, depending on the percentage of solids in the pulp fed to the filter. The sheet of coal covers the entire surface of the filter, there being no holes or breaks in the cake, and the cake is very dense or packed, due to the vibrations. The packing squeezes the water out of the coal and at the same time forces the water through the filter cloth.

In Fig. 7 a slightly modified form of suspension has been shown and which differs from that shown in Fig. 5 by the inclusion of an additional spring suspension means 29a.

In Fig. 8 the filter has been shown as incorporated in the circuit of a flotation machine. The flotation machine consists of several cells 36. The material is fed into the flotation machine at 37 and the tailings are discharged at 38 while the concentrates or the froth is discharged into a launder 39 that conducts it to a centrifugal pump 40 from which it passes to the filter along the path indicated by arrow 35. The filter cake is discharged at the upper end of the filter and drops onto the conveyor 41. The filtrate may either flow to waste or, if flotation products are being filtered, it may be conducted by launders 42 and 43 to a centrifugal pump 44 which returns it to the flotation machine as indicated by arrows 45 and 46 in Fig. 8.

Experiments have shown that the filter frame must be so constructed that it will be as rigid as possible so that it will vibrate as a unit; there must be no bending or flexing in any direction with the machine either empty or loaded with pulp and cake. If there are overrunning, following or cross vibrations which are out of step with the desired vibrations the filter will not work properly and extensive experiments have shown that the way to eliminate undesirable vibrations is to make the filter frame rigid and construct it in such a manner that it will vibrate as a whole.

The filter frame must also be made as light as consistent with the necessary strength. The vibrator must be strong enough to supply seventeen pounds of force for every pound weight of filter frame and its load of pulp and products.

For the best results the filter frame must be vibrated 1800 times per minute or 30 times per second, with vibrations having an amplitude of one sixteenth ($\frac{1}{16}$) of an inch, which means that the entire weight supported by the vibrator has to be started and stopped 3600 times per minute or 60 times per second.

In order to get the required rigidity of the filter frame the members 5 and 6 are made of angle iron and are welded at the corners so as to form an integral frame. The transverse stiffening members 7 are welded to the frame members 5 at their ends and arranged with their planes in the line of impact as already explained.

Attention is called at this point to the fact that the frame has no longitudinally extending stiffening members but only the transverse members 7, for it has been demonstrated that longitudinal supports for the filter medium causes the filter cake to divide longitudinally so as to form what is known as "snakes" and this decreases the capacity of the filter. If the transverse stiffening members 7 lack the required amount of stiffness this also interferes with the formation of the filter cake. It is also very important that the filter cloth surface shall be as nearly as possible a plane and that it shall not be concave. The upper edges of the stiffening members have therefore been slightly cambered as shown in Fig. 9 and this serves to maintain the filter screen flat and tight during operation. The filter cloth must be so supported that it will be quite stiff and this is effected by the perforated steel plate 8 and also by stretching the screen and the filter cloth so as to keep them under tension.

The spring suspension of the vibrator is primarily for the purpose of preventing the vibrations from being transmitted to the supports.

The filter frame and the surface of the filter cloth is supported in such a way that the slope varies from 5° to 12° and with such inclination the filter cake will move uniformly and not slide back.

Although an electrical vibrator has been indicated it is to be understood that any other means of producing the required vibrations can be used in lieu thereof, as for example a rotating cam.

The frame must not bend longitudinally and this is prevented by the deep sides 11.

It has also been found that the best results are obtained when the frame is made throughout of material of the same kind, such as soft steel, and all parts of which therefore have the same elasticity.

This filter has been found to be especially well adapted for filtering coal or other loose materials having no cohesion. Coal has heretofore been found to be very difficult to filter due to its low specific gravity and high permeability.

The operation of this filter produces no classification, stratification or grading but a continuous filter cake that also acts as a filter medium.

Although the angle of impact and the inclination of the filter frame given above have been found to give good results the critical angles for any particular material can only be accurately determined by experiment.

Having described the invention, what is claimed as new is:

1. Filtering apparatus comprising a receptacle for fluid pulps having an inclined filter medium providing the bottom thereof and having side walls and an imperforate end wall having an opening therein defining an overflow for determining the liquid level in the receptacle, said walls confining fluid pulps on said bottom to form a pool, and means for imparting differential vibrations to the receptacle whereby to induce a movement of filter cake upwardly out of the pool and across the end of the filter medium.

2. Filtering apparatus comprising a receptacle for fluid pulps having an inclined filter medium providing the bottom thereof and having side walls and an imperforate end wall having an opening therein defining an overflow, the height of said opening being adjustable for selectively determining the liquid level in the receptacle, said walls confining fluid pulps on said bottom to form a pool, and means for imparting differential vibrations to the receptacle whereby to induce a movement of filter cake upwardly out of the pool and across the end of the filter medium.

3. Filtering apparatus comprising a receptacle for fluid pulps having an inclined filter medium providing the bottom thereof and having side walls and an imperforate end wall having an opening therein defining an overflow, said walls confining fluid pulps on said bottom to form a pool, and means for imparting fast downward and slow upward vibrations to the receptacle at an acute angle to its bottom, whereby to induce a movement of filter cake upwardly out of the pool and across the end of the filter medium.

4. Filtering apparatus comprising a receptacle for fluid pulps having an inclined filter medium providing the bottom thereof and having side walls and an end wall confining fluid pulps on said bottom to form a pool, an overflow determining the liquid level in the receptacle, a vibrator disposed above the filter in suspending relation to one end thereof, means for resiliently supporting the vibrator, and another resilient means for maintaining the other end of the filter in suspension.

5. Filtering apparatus comprising a receptacle for fluid pulps having an inclined filter medium providing the bottom thereof and having side walls and an imperforate end wall having an opening therein defining an overflow for determining the liquid level in the receptacle, said walls confining fluid pulps on said bottom to form a pool, and means for imparting differential vibrations to the receptacle at an acute angle to the surface of the filter medium and in the direction of the inclination thereof whereby the formation of a filter cake and its movement upwardly out of the pool and across the end of the filter medium is induced.

6. A filter comprising, in combination, a longitudinally inclined elongated frame, wide stiffening members extending transversely thereof, and means for imparting to the frame vibrations at an acute angle to the plane thereof, the planes of the stiffening members being substantially parallel with the direction of vibration.

7. A vibrating filter frame having interconnected side and end members, stiffening members connecting the side members, the upper edges of the stiffening members being cambered and a filtering medium supported by the frame and the cambered edges.

8. A vibrating filter comprising, in combination, a frame having side and end members, the side members being inclined, wide beam-like stiffening members connecting the sides, the planes of the stiffening members being inclined at an acute angle with respect to the plane of the frame, a filter medium supported on the frame and stiffening members, and means for subjecting the frame to differential vibrations in the planes of the stiffening members.

9. Filtering apparatus, comprising a receptacle for fluid pulps having an inclined filter medium providing the bottom thereof and having side walls and an end wall confining fluid pulps on said bottom to form a pool, there being an opening distant from the bottom in one of said walls adjoining the pool, a gate slidable along said opening to vary its size and providing an overflow determining the liquid level in the receptacle, and means for imparting differential vibrations to the receptacle in a direction capable of inducing a movement of filter cake upwardly out of the pool and across the end of the filter medium.

10. Filtering apparatus comprising a receptacle for fluid pulps having an inclined filter medium providing the bottom thereof and having side walls and an end wall confining fluid pulps on said bottom to form a pool, means forming an overflow determining the liquid level in the receptacle, and a mechanism overhanging the receptacle and operatively connected therewith in balanced-suspending relation for imparting differential vibrations to the receptacle.

11. Filtering apparatus comprising a receptacle for fluid pulps having an inclined filter medium providing the bottom thereof and having side walls and an end wall confining fluid pulps on said bottom to form a pool, means forming an overflow determining the liquid level in the receptacle, and a mechanism resiliently supported to overhang the receptacle and operatively connected therewith in balanced-suspending relation for imparting differential vibrations to the receptacle.

PHILIP M. FRANTZ.
GEORGE H. RUPP.